United States Patent [19]

Newell

[11] 4,065,685
[45] Dec. 27, 1977

[54] INTERPOLATING STEP MOTOR SYSTEM WITH REDUCTION DRIVE INTERFACE

[75] Inventor: Harold R. Newell, South Newbury, N.H.

[73] Assignee: Mesur-Matic Electronics Corporation, Salem, Mass.

[21] Appl. No.: 713,310

[22] Filed: Aug. 10, 1976

[51] Int. Cl.[2] .......................................... H02K 37/00
[52] U.S. Cl. ................................. 310/49 R; 310/83; 310/112
[58] Field of Search .................... 310/49, 83, 112, 114, 310/115, 116, 117, 118, 121; 318/45

[56] References Cited

U.S. PATENT DOCUMENTS

| | | | |
|---|---|---|---|
| 2,051,249 | 8/1936 | Edwards | 310/112 X |
| 2,808,556 | 10/1957 | Thomas | 310/49 X |
| 3,268,785 | 8/1966 | Gerber et al. | 310/49 X |
| 3,575,621 | 4/1971 | Voland et al. | 310/112 |
| 3,586,938 | 6/1971 | Le Gall et al. | 310/112 X |
| 3,950,686 | 4/1976 | Randall | 318/45 X |

*Primary Examiner*—Donovan F. Duggan
*Attorney, Agent, or Firm*—Pollock, Vande Sande & Priddy

[57] ABSTRACT

Two step motors are interconnected so that the rotor or output shaft of one drives the stator or field structure of the other via a reduction drive assembly, so that the output shaft of the other motor may advance a load to an interpolated position between steps of the output shaft to which the load is directly connected. Anti-backlash means is associated with the reduction drive assembly which has a high reduction gear ratio to enable use of two motors both of which have large angle stepping angles.

10 Claims, 4 Drawing Figures

INTERPOLATING STEP MOTOR SYSTEM WITH REDUCTION DRIVE INTERFACE

BACKGROUND OF THE INVENTION

This invention pertains to the accurate and precise positioning of loads by an electric step motor system and is related to the system disclosed in my U.S. Pat. No. 3,644,764 and in my prior copending application Ser. No. 657,989 filed Feb. 13, 1976.

Disclosed in my patent and application, referenced above, are a pair of step motors interconnected in series and simultaneously pulsed for stepped advancement of a load to a selected position. The step motor driving the load has a relatively large angle stepping characteristic for rapid advancement of the load toward a final position that is interpolated between large angle steps by the simultaneous drive of the other step motor having a relatively small angle stepping characteristic. It is therefore an important object of the present invention to provide a plural step motor system of the foregoing type wherein both step motors are of the large angle type and nevertheless provide interpolated positioning of a load with comparable accuracy.

SUMMARY OF THE INVENTION

In accordance with the present invention, the rotor of one large angle step motor is drivingly connected to the field structure or phase windings of another large angle step motor by a high reduction drive ratio interface having the necessary accuracy and stiffness to avoid positioning error and backlash.

In one embodiment of the invention, the reduction drive interface is in the form of a worm and worm wheel intermeshed under the bias of a spring, with the worm wheel preloaded by an axial thrust to eliminate backlash. A multi-threaded worm wheel is utilized for extended gear contact with enveloping teeth of the meshing worm gear driven by one step motor, positioned at right angles to another step motor having its field structure driven by the worm wheel.

DESCRIPTION OF PREFERRED EMBODIMENT

Figure 1:
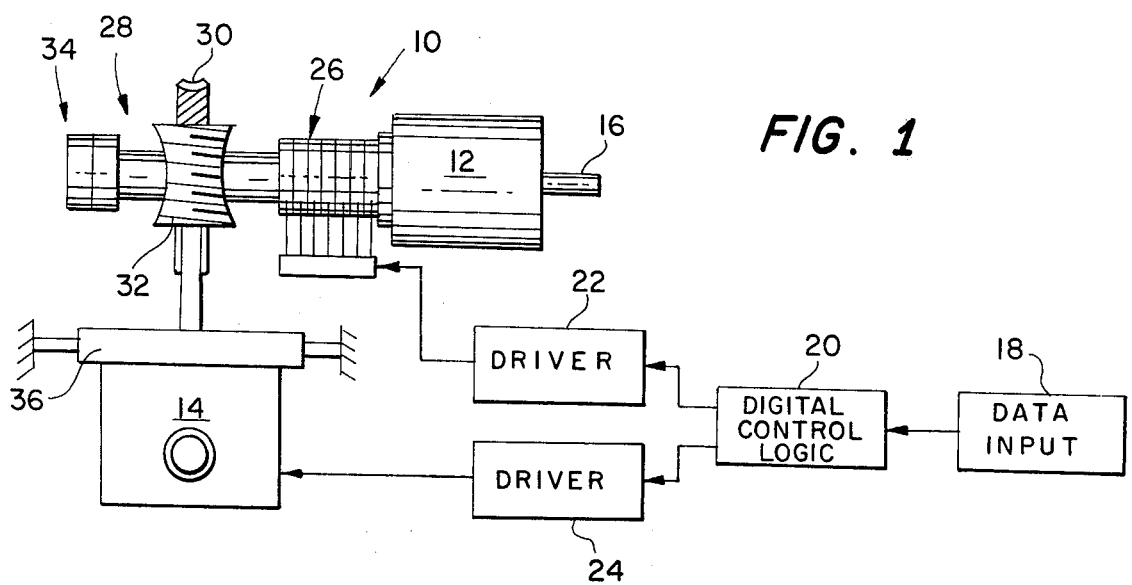
FIG. 1 is a schematic illustration of one embodiment of the present invention.

Referring now to the drawings in detail, FIG. 1 illustrates a typical system arranged in accordance with the present invention and generally denoted by reference numeral 10. The system includes a pair of step motors 12 and 14 of the large angle type such as those referred to in my prior copending application aforementioned. The rotor element of step motor 12 is connected to a load (not shown) through output shaft 16 to be advanced to a position preselected by commands from a data input source 18. Selection of the position is effected through digital logic 20 and drivers 22 and 24, which respectively step each motor through a predetermined number of steps to final positions. The driving pulses are applied by driver 22 to the phase windings of step motor 12 through a slip ring and brush assembly 26, to enable the field structure of motor 12 to be driven regardless of its angular position, through complete revolutions, whereas driving pulses are directly applied to the phase windings of the substantially stationary stator of step motor 14 from driver 24 since the latter stator does not rotate. The rotor of step motor 14 is drivingly connected to the field structure of step motor 12 by a high reduction ratio drive assembly generally referred to by reference numeral 28, and both step motors may then be identical large angle step motors.

In accordance with one embodiment of the invention, the reduction drive assembly 28 includes a worm wheel 30 connected directly to and rotationally with respect to the field structure of step motor 12, and in mesh with a worm gear 32 connected to the rotor of step motor 14. The axial thrust is maintained on the worm wheel 30 for anti-backlash purposes by a preloaded bearing assembly 34 arranged in coaxial relation to the field structure and rotor of step motor 12, while the step motor 14 is mounted in perpendicular relation to the motor 12 on a pivotally mounted and spring biased mounting plate 36 so that rotor 12 may drive worm gear 32 about an axis disposed in perpendicular relation to the common rotational axis of the worm wheel 30 and the field structure of step motor 12. The mounting plate 36 is pivotally mounted by a frame about a pivotal axis 37 extending at right angles to the rotor axis of step motor 14.

Figure 2:
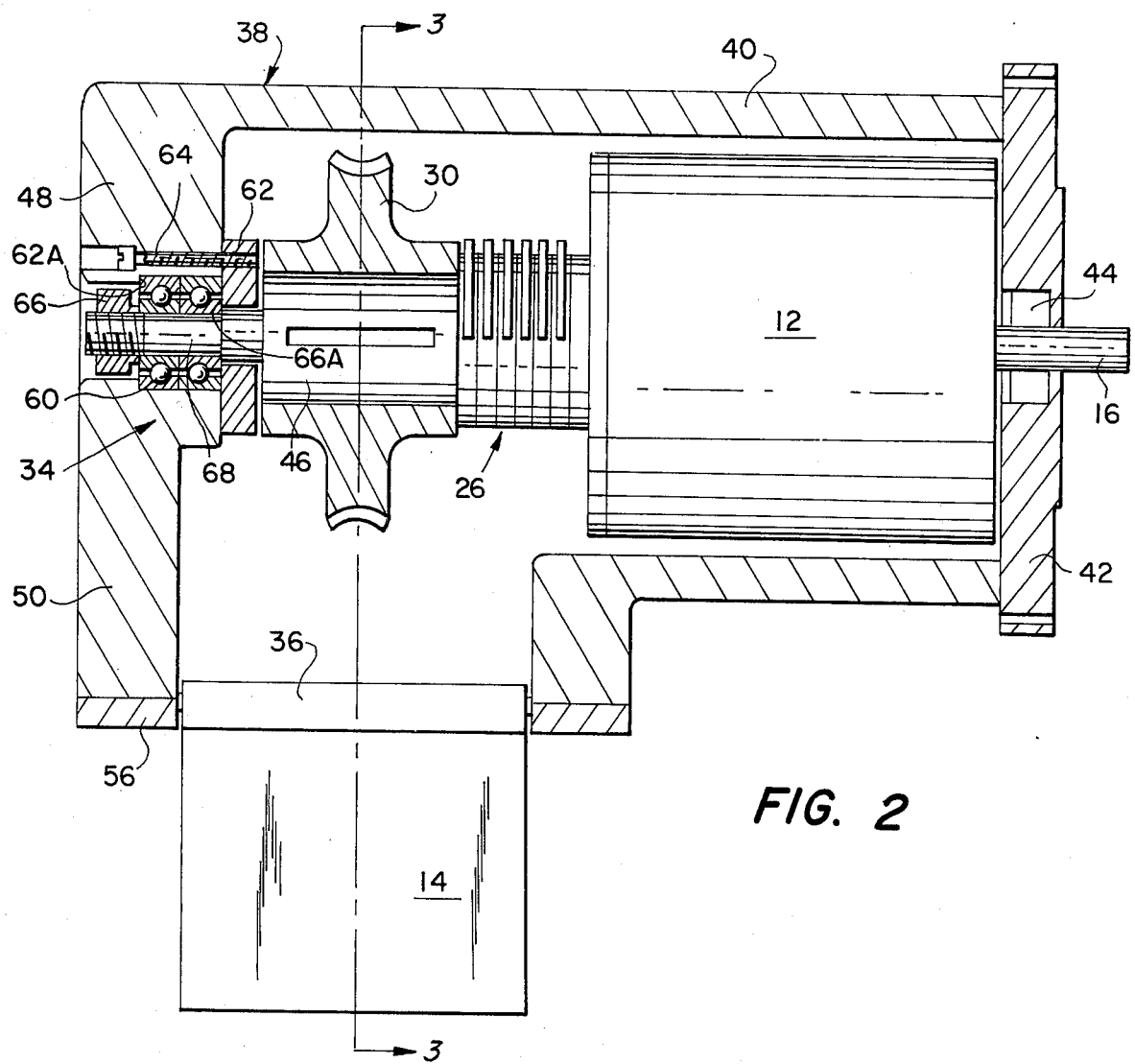
FIG. 2 is a partial sectional view of apparatus constructed in accordance with the embodiment depicted in FIG. 1.
Figure 4:
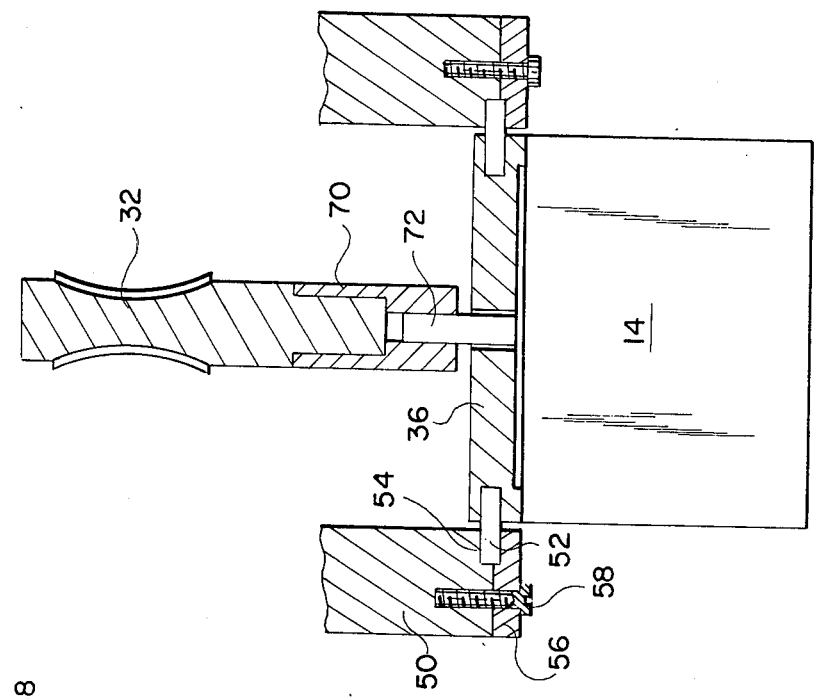
FIG. 4 is a partial sectional view taken substantially through a plane indicated by section line 4—4 in FIG. 3.
Figure 3:
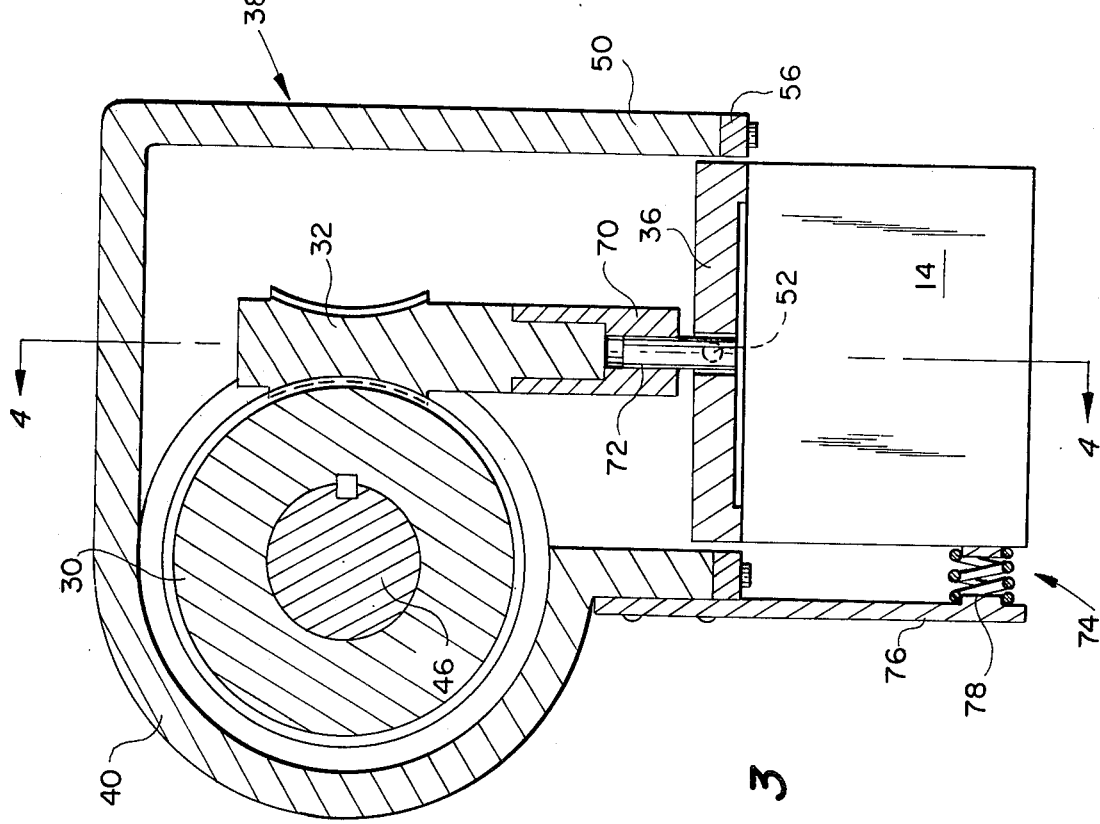
FIG. 3 is a sectional view taken substantially through a plane indicated by section line 3—3 in FIG. 2.

As shown in FIGS. 2, 3 and 4, a frame is established by a housing generally referred to by reference numeral 38 enclosing the step motor 12, the slip ring and brush assembly 26, the reduction drive assembly 28 and the anti-backlash device 34. The housing 38 includes an elongated tubular wall 40 (FIG. 2), and an end wall 42, through which the output shaft 16 extends. Shaft 16 is rotatably supported by a bearing assembly 44 supported in end wall 42.

The stator of the step motor 12 is supported by a plural diameter shaft 46 supported in coaxial relation to the output shaft 16 by the anti-backlash bearing device 34 mounted in an end wall 48 of the housing located opposite to and parallel with the end wall 42. An extension of end wall 50 and right angled extension 50a of wall 40 extend at right angles to the tubular wall 40 to support the step motor 14 so that the output shaft of step motor 14 is in right angle relationship to output shaft 16 of step motor 12.

As more clearly seen in FIG. 2, the mounting plate 36 for the step motor 14 is provided with a pair of pins 52 projecting into walls 50 and 50a, to establish a pivotal axis at right angles to the rotational axis of the rotor of motor 14. The pins 52 are held within semicircular recesses 54 formed in the housing portion 50 and in a plate 36 secured to the housing portion by bolts 58.

As shown in FIG. 2, the plural diameter shaft 46 is supported in the end wall 48 of the housing by means of a pair of bearing assemblies 60 associated with the anti-backlash bearing device 34. The bearing assembly 60 consists of two bearings selected for use as a preloaded pair. They are built so that when the proper faces of their inner and outer races are pressed together, it removes all axial "play" between the combined bearing's inner and outer races.

Accordingly, screws 64 serve to clamp the outer races together between plate 62 and lip 62A in end wall 48. Inner races are clamped together by nut 66 forcing them against larger diameter shaft area 66A.

The worm wheel 30 is preferably of the multiple thread type and is in meshing engagement with the worm gear 32 having a shape adapted for enveloping the helical teeth of the worm wheel 30, in order to increase the area of contact beween the gear teeth. This arrangement provides for positional averaging and indexing accuracy of a high order. For example, positioning accuracy of ±0.07° can be expected.

The worm gear 32, see FIG. 4, is connected by a coupling 70 to the rotor shaft 72 of step motor 14, the rotor shaft 72 projecting through a central opening in the mounting plate 36. The worm gear 32 is spring biased into meshing engagement with the worm wheel in order to compensate for wear, which enables backlash and positioning error to occur, by a spring device 74, FIG. 3. The spring device may include, for example, a helical compression spring element 76 supported by a plate 78 secured to the housing portion 50, the spring element reacting against the side of the step motor 14 in order to bias it in a counter-clockwise direction as viewed in FIG. 3 relative to the pivotal axis established by pins 52.

To indicate the typical method of operation, consider motors 12 and 14 are similar large angle stepping motors each turning 1.8°/step, motor 12 developing 200 in-oz torque and motor 14 developing 110 in-oz torque. The gears are a set of cone drive gears, size 7200 with a 10 to 1 ratio, 2 inch center distance, right hand helix, hub type gear, single extended worm, 6000 RPM, 0.2 HP, class 1. Thus, one step movement of motor 14 results in 0.18° rotation of output shaft 16, due to the gear ratio. At the same time, a single step of motor 12 results in the 1.8° rotation, either in the same or in the opposite direction. Thus, rotation in 0.18° increments or 1.8° increments is available, in either direction for rapid and, at the same time, accurate stepping.

The drivers 22 and 24 can be identical to driver 34 in the aforementioned application the disclosure of which is incorporated herein by reference. The construction of digital control logic 20 to generate the pulse trains for application to drivers 22 and 24 so as to properly position shaft 16 is deemed well within ordinary skill and is therefore not disclosed herein.

I claim:

1. In combination with first and second step motors each having field and rotor elements and energizing means for simultaneously stepping both of the motors, means for effecting advancement of the rotor element of said first step to an interpolated position between steps, comprising reduction gear means drivingly connecting the rotor element of said second step motor to the field element of said first step motor for stepped advancement of the field element through steps smaller than the steps through which the rotor elements are advanced.

2. The combination of claim 1, wherein said reduction gear means includes means for substantially preventing backlash.

3. The combination of claim 1, wherein said reduction gear means includes intermeshing helical gears formed in enveloping relationship to each other.

4. The combination of claim 3, including a housing, bearing means carried by the housing and supporting the rotor and field elements of said first step motor for simultaneous rotation about a common axis, coupling means connecting the rotor element of said second step motor to one of the helical gears, supporting means mounting the field element of said second step motor for limited displacement relative to the housing, and biasing means engageable with the second step motor for yieldably holding the helical gears in meshing engagement with each other.

5. The combination of claim 4, wherein said supporting means includes pivot means establishing a pivotal axis for the field element of said second step motor intersecting a rotational axis about which the rotor element of said second step motor is driven.

6. The combination of claim 5, including preloaded axial thrust means engageable with the bearing means rotationally supporting the field element of said first step motor.

7. The combination of claim 6, wherein said helical gears are a worm and a worm wheel.

8. The combination of claim 4, including preloaded axial thrust means engageable with the bearing means rotationally supporting the field element of said first step motor.

9. The combination of claim 3, wherein said helical gears are a worm and a worm wheel.

10. The combination of claim 3, wherein said reduction gear means includes means for substantially preventing backlash.

* * * * *